United States Patent
Reuss

(10) Patent No.: US 7,096,860 B2
(45) Date of Patent: Aug. 29, 2006

(54) CHARGE COOLING CIRCUIT FOR A MULTI-CYLINDER INTERNAL COMBUSTION ENGINE WITH A TURBO-SUPERCHARGER

(75) Inventor: Thomas Reuss, Neuenstadt (DE)

(73) Assignee: Audi AG, (DE)

( * ) Notice: Subject to any disclaimer, the term of this patent is extended or adjusted under 35 U.S.C. 154(b) by 0 days.

(21) Appl. No.: 10/398,476

(22) PCT Filed: Sep. 28, 2001

(86) PCT No.: PCT/EP01/11236

§ 371 (c)(1),
(2), (4) Date: Sep. 8, 2003

(87) PCT Pub. No.: WO02/31329

PCT Pub. Date: Apr. 18, 2002

(65) Prior Publication Data

US 2004/0040548 A1 Mar. 4, 2004

(51) Int. Cl.
*F02B 29/04* (2006.01)
*F02B 33/00* (2006.01)
*F01P 3/18* (2006.01)
*F02C 6/12* (2006.01)
*F28D 1/04* (2006.01)

(52) U.S. Cl. .................. 123/563; 60/599; 123/542; 165/139; 165/143

(58) Field of Classification Search ................. 123/563, 123/542; 60/599; 165/139, 143; F02B 29/04
See application file for complete search history.

(56) References Cited

U.S. PATENT DOCUMENTS

| 4,190,102 A | * | 2/1980 | Gerz | 165/139 |
| 6,336,447 B1 | * | 1/2002 | Bartel et al. | 123/563 |

FOREIGN PATENT DOCUMENTS

| DE | P 20 59 220.5 | | 6/1972 |
| DE | 31 04 124 A1 | | 9/1982 |
| DE | 43 31 072 C1 | | 12/1994 |
| DE | 195 47 994 A1 | | 6/1997 |
| EP | 0 522 471 A1 | | 1/1993 |
| EP | 780555 A2 | * | 6/1997 |
| FR | 1535728 | | 7/1968 |
| GB | 2001128 A | * | 1/1979 |
| JP | 60073013 A | * | 4/1985 |

* cited by examiner

*Primary Examiner*—Sheldon J Richter
(74) *Attorney, Agent, or Firm*—Stevens, Davis, Miller & Mosher, LLP

(57) ABSTRACT

In a charge-air cooling circuit for a multicylinder internal-combustion engine 1 with a turbo-supercharger 2, downstream from the turbo-supercharger 2 the charge air fed to two separate charge-air coolers 6, 6', whereby the first charge-air cooler 6 divides the charge air into two flow branches I, II, cools the first of the two flow branches I, and allows the second of the two flow branches II to pass uncooled, and whereby the second charge-air cooler 6' allows the first of the two flow-branches I to pass uncooled, cools the second of the two flow branches II, and then recombines the two flow branches I, II.

10 Claims, 1 Drawing Sheet

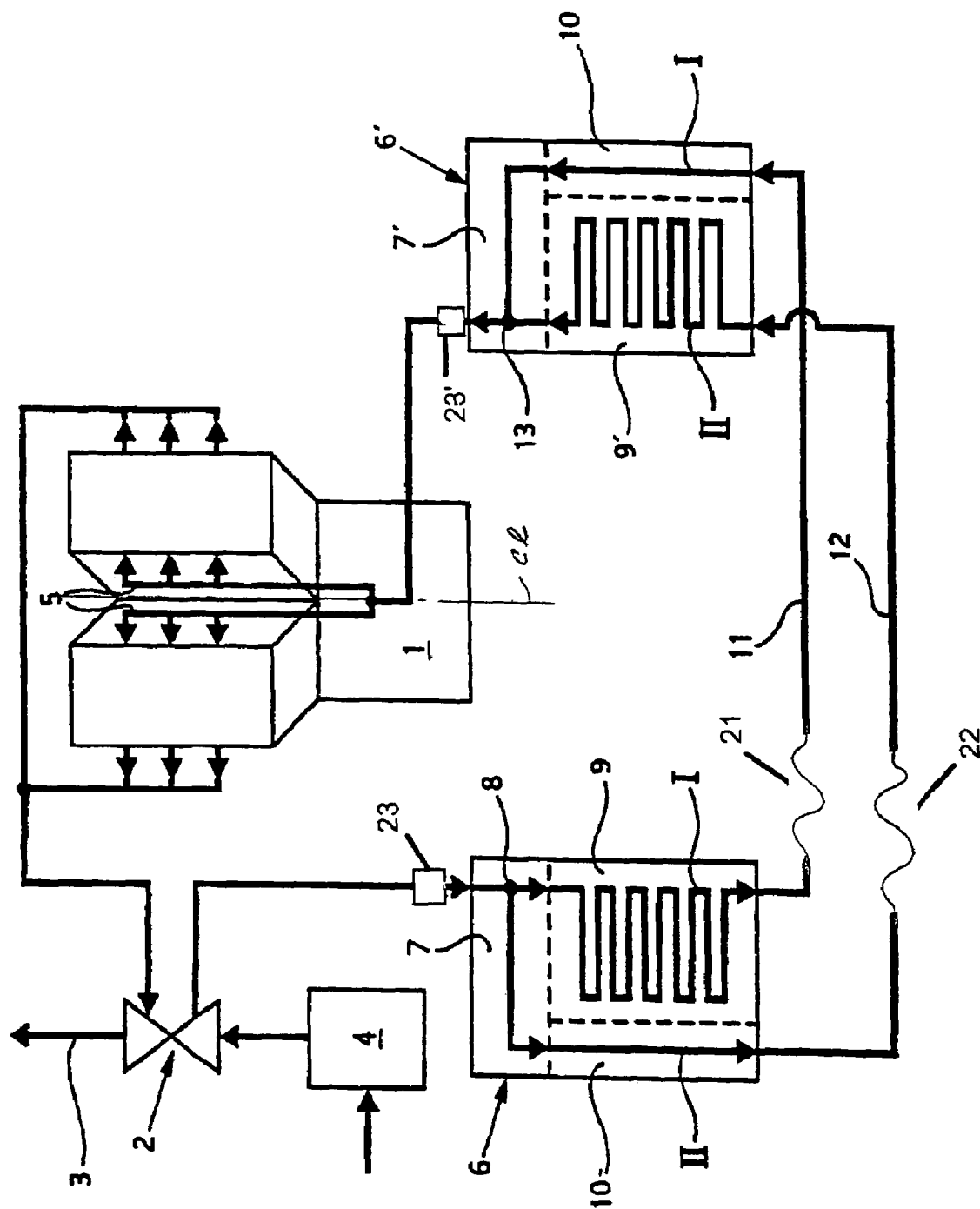

CHARGE COOLING CIRCUIT FOR A MULTI-CYLINDER INTERNAL COMBUSTION ENGINE WITH A TURBO-SUPERCHARGER

The present invention relates to a charge cooling circuit for a multi-cylinder internal-combustion engine with a turbo-supercharger.

BACKGROUND OF THE INVENTION

From document DE 31 04 124 A1 a charge-air cooler for a vehicle with a supercharged internal-combustion engine is known, whereby in order to reduce the size of the charge-air cooler a bypass that has a valve arrangement and that blocks the bypass in a low rpm range of the internal-combustion engine is provided.

Moreover, document DE 31 04 072 C1 describes a process for accelerating the warming-up of an engine in which, depending on the cooling-water temperature and the temperature of the charge air, the charge air is directed to the internal-combustion engine either through a charge-air cooler or through a bypass.

If high charge-air temperatures prevail, however, with the charge-air cooling circuits disclosed in these documents there is the problem that the surface area of the charge-air cooler has to be as large as possible in order to ensure adequate cooling, but it is very difficult to accomplish this because of the cramped conditions that prevail in the engine compartment.

Finally, from document DE 195 47 994 A1 a V-design internal-combustion engine with two exhaust-gas turbo-superchargers that operate in parallel is known, whereby from each of the two exhaust-gas turbo-superchargers a feed line runs to one of two charge-air coolers that are arranged next to each other and whereby from each of the two charge-air coolers a return line runs to an intake system. To create a switchable bypass, provisions are made to ensure that in each case the feed line of the one charge-air cooler is connected to the return line of the other charge-air cooler and that this connection is equipped with a switchable bypass valve.

In all the charge-air cooling circuits described by the above-mentioned documents, there is also the problem that the cooling results that can be achieved are not entirely satisfactory.

SUMMARY OF THE INVENTION

Taking this state of the art as a point of departure, the object of the present intention is to design a charge-air cooling circuit for a multi-cylinder internal-combustion engine with a turbo-supercharger whereby said the charge-air cooling circuit can be readily accommodated in the engine compartment and whereby said charge-air cooling circuit provides better cooling performance than that offered by the state of the art.

This object is achieved by virtue of the fact that downstream from the turbo-supercharger the charge air is fed to two separate charge-air coolers, whereby the first charge-air cooler divides the charge air into two flow branches, effectively cools the first of the two flow branches, and allows the second of the two flow branches to pass essentially uncooled, and whereby the second charge-air cooler allows the first of the two flow branches to pass essentially uncooled, effectively cools the second of the two flow branches, and then recombines the two flow branches.

This makes it possible to have two smaller charge-air coolers rather than one large charge-air cooler and to arrange for these two charge-air coolers to be largely independent of one another, such that they occupy favorable locations in the engine compartment and do not interfere with one another. Moreover, the charge air, which is split into two flow branches, can be cooled more effectively because, as experiments with the charge-air cooling circuit according to the invention have shown, the cooling of the two flow branches, which takes place in different sequences and at different locations, turns out to be especially effective.

According to the invention, the first charge-air cooler has an inlet for the charge air to which one air receiver with a branching point is connected, whereby the first flow branch is directed to the branching point through a cool pass, the second flow branch is directed to the branching point through a bypass, and the two flow branches are then directed to two separate outlets of the cool pass and the bypass.

Moreover, the second charge-air cooler according to the invention has two separate inlets for the two flow branches to which a bypass and a cool pass are connected, whereby the first flow branch is directed through the bypass, the second flow branch is directed through the cool pass, the two flow branches are then directed inside the air receiver to a combining point, and an outlet for the charge air is connected to the combining point.

It is advantageous for the first charge-air cooler and the second charge-air cooler to be designed to be mirror-symmetric. The reason is that in this way the two charge-air coolers can be produced in a cost-effective manner.

It is advisable for the two flow branches to have the same quantities of charge air in order to ensure that the two flow branches have approximately the same temperature in the area of the combining point so that the charge air that is fed to the intake system of the internal-combustion engine has a largely homogeneous temperature distribution.

It is likewise advisable for both of the two flow branches to be of approximately the same length from the branching point inside the air receiver of the first charge-air cooler to the combining point inside the air receiver of the second charge-air cooler. This makes it simpler to design the two flow branches alike.

Of course, the branching point inside the air receiver of the first charge-air cooler and/or the combining point inside the air receiver of the second charge-air cooler can also be equipped with a controllable element so that the output of the charge-air cooling circuit can be reduced during the cold-start phase of the internal-combustion engine. The reason for this is that the controllable element makes it possible to direct the charge air to the intake system of the internal-combustion engine in an essentially uncooled state, i.e., through the bypasses only, and to bring about effective cooling of the charge air only after a certain temperature is reached.

The two flow branches that extend between the two charge-air coolers are preferably designed at least partially as a rigid double tube, whereby the two charge-air coolers and the rigid double tube are each connected together by means of flexible delivery hoses. With this approach, the charge air can be directed even over a relatively long distance inside the engine compartment, thereby avoiding the use of long suspended and thus easily damaged delivery hoses.

In a special embodiment, the two charge-air coolers are arranged on either side of the multi-cylinder internal-combustion engine in the engine compartment, i.e., at positions that are favorable for flow. Moreover, if in both charge-air coolers the cool pass is arranged on the side facing the internal-combustion engine while the bypass is arranged on the side of the internal-combustion engine facing away from the engine, then this arrangement is also especially appropriate in cases where the charge-air coolers are to be installed in a V-design in a multicylinder internal-combustion engine.

If in addition the second charge-air cooler has a pressure sensor in the area of the air receiver, then by monitoring the pressure prevailing there and, optionally, controlling the turbo-supercharger it is possible to set a charge pressure that is optimal for the running state of the internal-combustion engine.

BRIEF DESCRIPTION OF THE DRAWING

This invention is explained in greater detail by referring to the following drawing figure, wherein:

FIG. 1 shows the charge-air cooling circuit according to the invention for a multi-cylinder internal-combustion engine with a turbo-supercharger.

DETAILED DESCRIPTION OF THE INVENTION

In the case of a multi-cylinder internal-combustion engine 1 whose cylinders are arranged in a V design with respect to one another, the exhaust gas is directed through a turbo-supercharger 2 to an exhaust gas system 3.

The turbo-supercharger 2 that is driven in this way compresses to a certain charge pressure the fresh air that is taken in by way of a downstream air filter 4, thereby raising the temperature of the charge air.

Before the hot charge air can be fed to the intake system 5 of the internal-combustion engine 1, it is cooled by means of the first charge-air cooler 6 and by means of a second charge-air cooler 6'. This is done by ensuring that all of the charge air is initially fed to the first charge-air cooler 6 in whose air receiver 7 a branching point 8 is located where the charge air is split into two flow branches I, II, whereby the first flow branch I is directed through a cool pass 9 located inside the first charge-air cooler 6, while the second flow branch II is directed through a bypass 10 located inside the first charge-air cooler 6. Then the two flow branches I, II exit the first charge-air cooler 6 and are directed through separate lines 11, 12 to the second charge-air cooler 6'. These lines 11, 12 can be formed at least partially by a rigid double tube, thereby increasing the mechanical strength of the arrangement. In the second charge-air cooler 6', and the first flow branch I is directed through a bypass 10', while the second flow branch II is directed through a cool pass 9'. Lines 11 and 12 may also include flexible delivery hoses 21, 22. Downstream from the bypass 10' and the cool pass 9', the two flow branches I, II are fed to the air receiver 7' of the second charge-air cooler 6' by virtue of the fact that a combining point 13 is provided for the two flow branches I, II. Behind the second charge-air cooler 6', all of the charge air is fed through the intake system 5 of the internal-combustion engine 1. Pressure sensors 23 and 23' may also be located in the area of the air receivers 7, 7'.

The first and second charge-air coolers 6, 6' are arranged on either side of the internal-combustion engine 1 since this arrangement is especially favorable for flow and, despite the cramped conditions that exist in the engine compartment, said arrangement allows a relatively large cooling surface area. The two cool passes 9, 9' are both located on the sides of the charge-air coolers 6, 6' that face the internal-combustion engine 1, and the two bypasses 10, 10' are both arranged on the sides of the charge-air coolers 6, 6' facing away from the internal-combustion engine 1.

The invention claimed is:

1. An intake air cooling circuit for an internal combustion engine provided with a turbocharger, comprising:
    a first body including a first compartment containing a cooling medium and a second compartment;
    a second body including a first compartment containing a cooling medium and a second compartment;
    an input line communicating with said turbocharger;
    an output line communicating with said engine;
    a first branch line uninterruptibly intercommunicating said intake and outlet lines, traversing through said first compartment of said first body in heat transfer relation with said cooling medium therein, and said second compartment of said second body; and
    a second branch line uninterruptibly intercommunicating said intake and outlet lines, traversing through said second compartment of said first body and said first compartment of said second body in heat transfer relation with said cooling medium thereof.

2. A circuit according to claim 1 wherein said branch lines are configured to conduct equal volumes of air.

3. A circuit according to claim 1 wherein the lengths of said branch lines are substantially equal.

4. A circuit according to claim 1 including flow control means disposed in said inlet and outlet tines.

5. A circuit according to claim 1 wherein portions of said branch lines extending between said first and second bodies comprise flexible conduits.

6. A circuit according to claim 1 including at least one flow control means disposed at least at one of a point dividing air flow from said inlet line to said branch lines and a point recombining air flow from said branch lines to said outlet lines.

7. A circuit according to claim 1 wherein said first and second bodies are mirror images of each other.

8. A circuit according to claim 1 wherein said first and second bodies are disposed on opposite sides of a longitudinal centerline of said engine.

9. A circuit according to claim 8 wherein said first compartment of said first body is disposed between said second compartment of said first body and said centerline.

10. A circuit according to claim 8 wherein said first compartment of said second body is disposed between said second compartment of said second body and said centerline.

* * * * *